(12) United States Patent
Fleming, III

(10) Patent No.: US 10,975,898 B2
(45) Date of Patent: Apr. 13, 2021

(54) METHOD AND SYSTEM FOR INTERCONNECTING STRUCTURAL PANELS

(71) Applicant: Joseph C. Fleming, III, Pomona, CA (US)

(72) Inventor: Joseph C. Fleming, III, Pomona, CA (US)

( * ) Notice: Subject to any disclaimer, the term of this patent is extended or adjusted under 35 U.S.C. 154(b) by 110 days.

(21) Appl. No.: 15/807,675

(22) Filed: Nov. 9, 2017

(65) Prior Publication Data

US 2018/0135670 A1 May 17, 2018

Related U.S. Application Data

(60) Provisional application No. 62/421,767, filed on Nov. 14, 2016.

(51) Int. Cl.
| | |
|---|---|
| *F16B 5/00* | (2006.01) |
| *E04B 1/61* | (2006.01) |
| *E04B 2/00* | (2006.01) |
| *E04B 2/72* | (2006.01) |
| *B27F 5/02* | (2006.01) |
| *B23B 35/00* | (2006.01) |

(52) U.S. Cl.
CPC .......... *F16B 5/0036* (2013.01); *E04B 1/6162* (2013.01); *F16B 5/0084* (2013.01); *B23B 35/00* (2013.01); *B27F 5/02* (2013.01); *E04B 2/721* (2013.01); *E04C 2/46* (2013.01)

(58) Field of Classification Search
CPC .... E04B 1/6145; E04B 1/6162; F16B 5/0036; F16B 5/0032; B27F 5/12; B27F 5/02
USPC .............................. 403/409.1; 52/578, 582.2
See application file for complete search history.

(56) References Cited

U.S. PATENT DOCUMENTS

| | | | |
|---|---|---|---|
| 1,843,430 A | | 2/1932 | Mayer |
| 2,647,287 A | * | 8/1953 | Jones ............... E04B 1/6183 52/582.2 |
| 2,815,795 A | | 12/1957 | Vander Poel |
| 2,910,396 A | | 10/1959 | Randall et al. |
| 3,077,223 A | | 2/1963 | Hartsell et al. |
| 3,235,920 A | * | 2/1966 | Davis ............... E04B 1/6158 52/586.1 |
| 3,280,522 A | * | 10/1966 | Palfey ............. E04B 1/6183 52/127.9 |
| 3,313,199 A | * | 4/1967 | Houvener ............ F16B 13/02 411/21 |

(Continued)

FOREIGN PATENT DOCUMENTS

DE 102009025822 A1 * 11/2010 ........... A47B 96/205

OTHER PUBLICATIONS

Machine Translation of DE102009025822A1 (Year: 2010).*

*Primary Examiner* — Jacob J Cigna
*Assistant Examiner* — Michael W Hotchkiss
(74) *Attorney, Agent, or Firm* — Weide & Miller, Ltd.

(57) ABSTRACT

A panel may be configured with panel mounts by forming a panel connector accepting slot in the panel and then locating connector mounts in the slot. In another embodiment, a panel may be configured with panel connector mounts by milling a panel to leave areas of panel material which form the mounts and milling the panel behind to connector mounts to define areas for accepting portions of the panel connector. Panels having the defined connector mounts may be connected by one or more panel connectors which engage the connector mounts.

5 Claims, 3 Drawing Sheets

(56) References Cited

U.S. PATENT DOCUMENTS

| | | | | |
|---|---|---|---|---|
| 3,332,182 A * | 7/1967 | Mark | ............... | E04B 2/7453 |
| | | | | 52/127.12 |
| 3,386,218 A | 6/1968 | Scott | | |
| 3,400,958 A * | 9/1968 | Haimes | ............... | E04B 1/6183 |
| | | | | 52/127.9 |
| 3,483,070 A | 12/1969 | Kennedy et al. | | |
| 3,490,800 A * | 1/1970 | Wissler | ............... | E04B 2/7453 |
| | | | | 52/586.2 |
| 3,512,819 A | 5/1970 | Morgan et al. | | |
| 3,567,260 A * | 3/1971 | Norris | ............... | E04B 1/6162 |
| | | | | 52/127.11 |
| 3,594,056 A * | 7/1971 | Sager | ............... | A47B 47/06 |
| | | | | 312/263 |
| 3,601,432 A * | 8/1971 | Fenwick | ............... | A47B 57/40 |
| | | | | 403/230 |
| 3,626,652 A | 12/1971 | Hanley | | |
| 3,640,039 A * | 2/1972 | McKee | ............... | F16B 5/0052 |
| | | | | 52/281 |
| 3,697,034 A * | 10/1972 | Shell | ............... | A47B 57/42 |
| | | | | 248/243 |
| 3,700,522 A | 10/1972 | Wonderly | | |
| 3,722,157 A * | 3/1973 | Prokop | ............... | E04B 2/825 |
| | | | | 52/481.2 |
| 3,749,465 A * | 7/1973 | Newcomer | ............... | A47B 47/00 |
| | | | | 312/245 |
| 3,894,377 A * | 7/1975 | Welch | ............... | F16B 12/22 |
| | | | | 52/584.1 |
| 3,895,144 A | 7/1975 | Kiefer | | |
| 4,004,856 A * | 1/1977 | Wesseler | ............... | A47B 57/40 |
| | | | | 403/186 |
| 4,030,846 A * | 6/1977 | Flototto | ............... | F16B 12/24 |
| | | | | 403/231 |
| 4,045,927 A * | 9/1977 | Diaz | ............... | E04B 1/6162 |
| | | | | 52/127.11 |
| 4,093,762 A | 6/1978 | Kiefer | | |
| 4,116,573 A * | 9/1978 | Fuchs | ............... | F16B 5/0607 |
| | | | | 403/264 |
| 4,223,500 A * | 9/1980 | Clark | ............... | E04C 2/384 |
| | | | | 52/127.9 |
| 4,299,067 A * | 11/1981 | Bertschi | ............... | E04B 1/6162 |
| | | | | 403/296 |
| 4,306,823 A * | 12/1981 | Nashlund | ............... | B23B 47/287 |
| | | | | 144/144.52 |
| 4,324,379 A * | 4/1982 | Ovitz, III | ............... | A47B 57/42 |
| | | | | 248/220.41 |
| 4,349,303 A | 9/1982 | Liebel et al. | | |
| 4,406,374 A * | 9/1983 | Yedor | ............... | A47B 57/40 |
| | | | | 211/192 |
| 4,587,788 A * | 5/1986 | Bielicki | ............... | E04B 1/6137 |
| | | | | 256/59 |
| 4,603,531 A | 8/1986 | Nash | | |
| 4,700,916 A * | 10/1987 | Bastian | ............... | A47B 57/42 |
| | | | | 211/192 |
| 4,712,286 A * | 12/1987 | Wolf | ............... | A47B 57/40 |
| | | | | 138/160 |
| 4,730,428 A | 3/1988 | Head et al. | | |
| 5,116,007 A * | 5/1992 | Von Gunton | ............... | A47B 57/42 |
| | | | | 108/108 |
| 5,154,385 A * | 10/1992 | Lindberg | ............... | A47B 57/562 |
| | | | | 248/225.11 |
| 5,211,502 A * | 5/1993 | Upham-Hill | ............... | E04B 2/7425 |
| | | | | 160/229.1 |
| 5,356,104 A * | 10/1994 | Rosenberg | ............... | A47B 96/061 |
| | | | | 248/223.41 |
| 5,433,009 A * | 7/1995 | Keels, Jr. | ............... | B27F 5/12 |
| | | | | 144/144.51 |
| 5,433,327 A * | 7/1995 | Benvenuti | ............... | A47B 57/42 |
| | | | | 108/108 |
| 5,480,117 A * | 1/1996 | Fleming, III | ............... | E04B 1/6183 |
| | | | | 248/231.9 |
| 5,499,667 A * | 3/1996 | Nakanishi | ............... | B27C 5/00 |
| | | | | 144/134.1 |
| 5,507,331 A * | 4/1996 | Nakanishi | ............... | B23C 5/1054 |
| | | | | 144/134.1 |
| 5,577,856 A * | 11/1996 | Tezuka | ............... | E04B 1/2604 |
| | | | | 403/294 |
| 5,592,787 A | 1/1997 | Ophardt | | |
| 5,592,794 A | 1/1997 | Tundaun | | |
| 5,595,226 A * | 1/1997 | Nakanishi | ............... | B23C 5/1054 |
| | | | | 144/134.1 |
| 5,601,266 A | 2/1997 | Fleming, III | | |
| 5,636,934 A * | 6/1997 | Nakanishi | ............... | E04B 1/2604 |
| | | | | 403/230 |
| 5,804,278 A | 9/1998 | Pike | | |
| 5,810,505 A | 9/1998 | Henriott et al. | | |
| 5,899,035 A * | 5/1999 | Waalkes | ............... | E04B 2/7433 |
| | | | | 52/239 |
| 6,050,033 A | 4/2000 | Wrightman | | |
| 6,105,794 A * | 8/2000 | Bauer | ............... | A47B 57/26 |
| | | | | 108/108 |
| 6,216,397 B1 | 4/2001 | Chang | | |
| 6,218,612 B1 | 4/2001 | McKitrick et al. | | |
| 6,299,397 B1 | 10/2001 | Mengel | | |
| 6,301,846 B1 * | 10/2001 | Waalkes | ............... | A47B 21/06 |
| | | | | 52/220.7 |
| 6,309,132 B1 * | 10/2001 | Jakob | ............... | B60R 11/00 |
| | | | | 403/200 |
| 6,345,925 B1 * | 2/2002 | Coleman | ............... | F16B 5/0088 |
| | | | | 198/844.2 |
| 6,425,563 B1 * | 7/2002 | Mihailoff | ............... | A47B 57/54 |
| | | | | 211/192 |
| 6,499,262 B1 | 12/2002 | Pinchot et al. | | |
| 6,546,684 B2 * | 4/2003 | Waalkes | ............... | E04B 2/7433 |
| | | | | 52/239 |
| 6,612,078 B2 * | 9/2003 | Hawang | ............... | A47B 47/042 |
| | | | | 403/353 |
| 6,799,404 B2 | 10/2004 | Spransy | | |
| 6,910,306 B2 * | 6/2005 | Waalkes | ............... | A47B 21/06 |
| | | | | 52/220.7 |
| D523,780 S | 6/2006 | Conny et al. | | |
| D533,950 S | 12/2006 | Givoni | | |
| 7,152,383 B1 | 12/2006 | Wilkinson, Jr. et al. | | |
| 7,288,164 B2 | 10/2007 | Roberge et al. | | |
| D556,346 S | 11/2007 | Schulte | | |
| D563,215 S | 3/2008 | Collins et al. | | |
| 7,448,168 B2 * | 11/2008 | Waalkes | ............... | A47B 21/06 |
| | | | | 52/220.2 |
| 7,815,391 B2 | 10/2010 | Kauppila | | |
| 8,056,289 B1 | 11/2011 | Konstantin | | |
| 8,092,112 B2 * | 1/2012 | Borgman | ............... | F16B 5/0216 |
| | | | | 403/231 |
| 8,252,137 B2 | 8/2012 | Fleming, III | | |
| 8,322,104 B2 * | 12/2012 | Fleming, III | ............... | B32B 3/06 |
| | | | | 160/87 |
| 8,573,880 B2 * | 11/2013 | Chen | ............... | A47B 47/042 |
| | | | | 403/331 |
| 8,689,511 B2 * | 4/2014 | Fleming, III | ............... | B32B 21/08 |
| | | | | 52/582.1 |
| 8,973,316 B2 * | 3/2015 | Safford | ............... | E04B 2/885 |
| | | | | 52/204.62 |
| 8,992,114 B2 * | 3/2015 | Ajanovic | ............... | F16B 12/2063 |
| | | | | 403/362 |
| 9,068,581 B2 * | 6/2015 | Fleming, III | ............... | B32B 21/08 |
| 9,084,485 B2 * | 7/2015 | Sukman | ............... | A47B 96/06 |
| 9,416,537 B2 * | 8/2016 | Spieth | ............... | E04B 2/7401 |
| 9,476,441 B2 * | 10/2016 | Strassle | ............... | F16B 7/0446 |
| 2002/0108323 A1 | 8/2002 | Gruber | | |
| 2003/0209701 A1 | 11/2003 | Goddard | | |
| 2004/0123548 A1 | 7/2004 | Gimpel et al. | | |
| 2008/0283583 A1 | 11/2008 | Hall | | |
| 2010/0003077 A1 * | 1/2010 | Kelley | ............... | F16B 5/0036 |
| | | | | 403/409.1 |
| 2010/0064619 A1 * | 3/2010 | Huang | ............... | E04B 2/7437 |
| | | | | 52/582.2 |
| 2011/0047922 A1 * | 3/2011 | Fleming, III | ............... | E04B 1/6162 |
| | | | | 52/582.1 |
| 2012/0099924 A1 * | 4/2012 | Chen | ............... | A47B 47/042 |
| | | | | 403/345 |

(56) References Cited

U.S. PATENT DOCUMENTS

| | | | |
|---|---|---|---|
| 2013/0239507 A1* | 9/2013 | Fleming, III | E04C 2/38 52/582.1 |
| 2013/0239607 A1* | 9/2013 | Kelly | F25D 3/08 62/457.3 |
| 2018/0135670 A1* | 5/2018 | Fleming, III | F16B 5/0036 |

* cited by examiner

US 10,975,898 B2

METHOD AND SYSTEM FOR INTERCONNECTING STRUCTURAL PANELS

RELATED APPLICATION DATA

The present application claims priority to U.S. Provisional Application Ser. No. 62/421,767, filed Nov. 14, 2016, the contents of which are incorporated by reference as if set forth herein.

FIELD OF THE INVENTION

Aspects of the invention comprise methods and systems for connecting panel members, as well as methods for forming or configuring panel members with connector mounts.

SUMMARY OF THE INVENTION

Aspects of the invention comprise methods of forming or locating mounts in panels, such as structural panels. In one embodiment, the mounts comprise brackets which are connected to the panels, and in other embodiments, portions of the panels comprise the mounts. Other aspects of the invention comprise panels having panel connector mounts and methods of connecting two or more panels, such as via one or more panel connectors.

In one embodiment, a panel may be configured with panel or connector mounts by forming a panel connector accepting slot in the panel and then locating one or more connector mounts in the slot. In one embodiment, the connector mount comprises a bracket and a bore may be formed which provides an access way for positioning the bracket in the slot.

In one embodiment, the bracket is mounted in a mounting channel which is formed in the slot. The mounting channel intersects the bore. The slot may have a first depth and the mounting channel may be located at a second, lesser depth. In this manner, a space is defined behind the bracket within the slot for accepting a portion of a panel connector.

In one embodiment, the bracket has at least one portion having a width which is greater than a width of the slot. The bracket may comprise, for example, a pair of washers which are connected to a mount, the mount having a width less than a width of the slot and the washers having a diameter which is greater than a width of the slot but smaller than the bore.

In another embodiment, a panel may be configured with panel connector mounts by milling a panel to leave areas of panel material which form the mounts and milling the panel to leave recesses for accepting portions of the panel connector. In one embodiment, slots are milled in a face or edge of a panel to define the connector mounts and one or more recesses are milled into the panel perpendicular to the slots to define an open area behind each panel connector into which a portion of a panel connect may be positioned. In another embodiment, slots are formed in a face or edge of a panel to define the connector mounts, a bore is formed in alignment with each slot and then a cutter is lowered into each bore and moved along each slot to remove material from behind each slot to form a recess behind the connector mount.

In one embodiment, panels having the mounts are connected via one or more panel connectors. The panel connectors may have at least one projection extending outwardly from first and second edges of the panel. The projections extending from one edge are engaged with the mounts of one panel and the projections extending from the opposing edge are engaged with the mounts of another panel, securing the panels to one another.

Further objects, features, and advantages of the present invention over the prior art will become apparent from the detailed description of the drawings which follows, when considered with the attached figures.

DETAILED DESCRIPTION OF THE INVENTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

The present invention comprises methods and systems for connecting panel members, including methods of making or forming panel connection elements.

The present invention is applicable to panel members of a variety of configurations and which may be used for various purposes. Examples of panel members are disclosed in U.S. Pat. No. 9,068,581, which is incorporated herein in its entirety by reference. The panels or panel members are preferably generally planar, having front and back faces, a top edge, a bottom edge, a pair of side edges and generally have a thickness dimension (from front to back) which is less (and usually much less) than the height and/or length of the panel. The panels may have any size and may have varying shapes. The panel might, for example, be square or rectangular in shape. In one embodiment, at least one side edge of a panel is straight, and preferably vertically oriented to facilitate the connection of the panel to another panel as described herein.

A panel of the invention might be used for or comprise a divider element, a wall element, a portion of a piece of furniture, or be used in various other manners. The panels might be solid, hollow core or have various other configurations, and may be constructed of a variety of materials such as wood or even plastic or the like.

U.S. Pat. No. 9,068,581 describes, among other things, a configuration in which anchor members may be located at edge portions of panels, the anchor members defining one or more connector mounts for connection to one or more panel connectors (see e.g. FIG. 4, wherein an anchor 100 is located in a slot at the edge of a panel, the anchor 100 defining a plurality of mounting 120, and wherein a panel connector 150 is configured to engage the panel, including the mounts 120, for connecting the panel to one or more other panels).

However, in some cases, forming a slot in a panel for acceptance of such an anchor can be problematic. For example, in some cases the formation of a slot from top to bottom along an edge of the panel allows layers of the panel to begin to peel or separate, or otherwise reduces the structure integrity and longevity of the panel.

Figure 1:
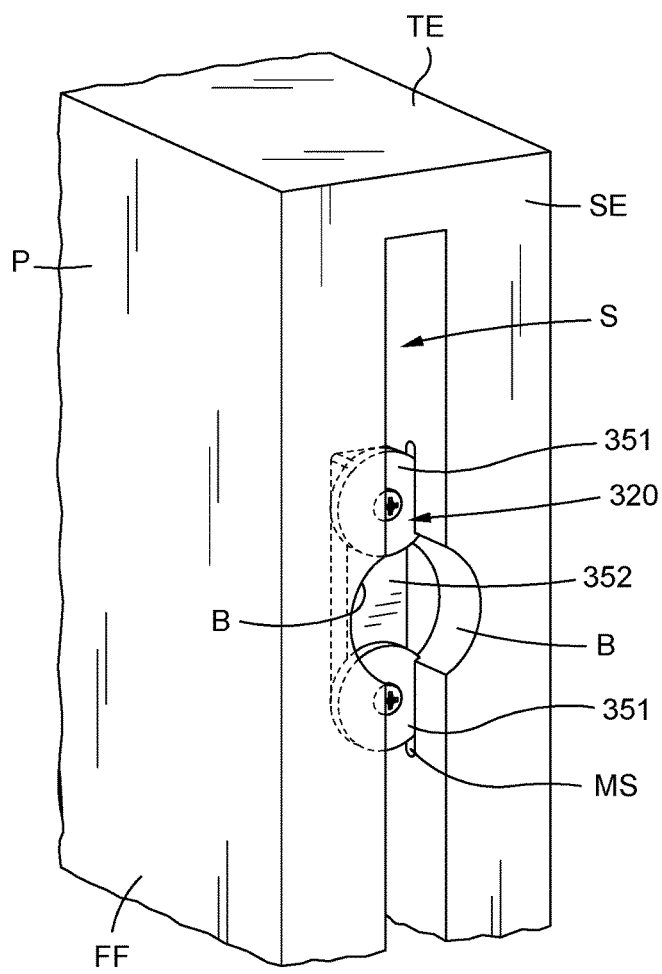
FIG. 1 is a perspective view of a portion of a panel having a connector mount associated therewith in accordance with one embodiment of the invention.
Figure 2:
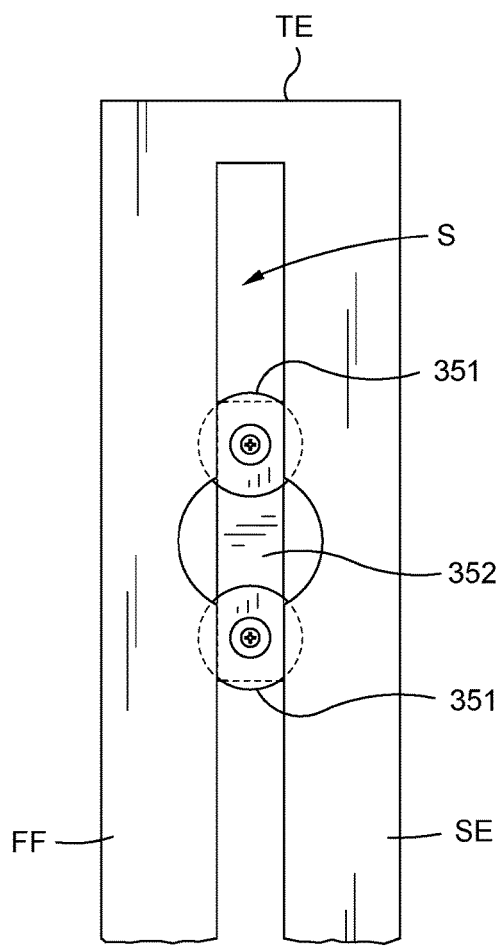
FIG. 2 is a plan view of an edge portion of the panel illustrated in FIG. 1.

FIG. 1 illustrates a panel P having a front face FF, a top edge TE, and a side edge SE. A slot S is formed in the side edge SE of the panel P. The slot S need not extend from the top edge TE to the bottom edge BE of the panel P, but might extend only along a portion of the side edge SE. Further, the slot S could be a single slot or a series of slots. The width and depth of the slot S are preferably selected to allow the slot S to accept therein at least a connection portion of a panel connector, such as the panel connector 350 illustrated in FIG. 4. As noted in U.S. Pat. No. 9,068,581, such panel connectors may have a variety of configurations. In one embodiment, the slot S has a depth which is at least equal to half of the width of a panel connector to be used therewith (whereby when two panels are connected, the edges thereof may contact with the panel connector which is connecting the two panels being located completely in the slots of the two panels). While the slot S may be relatively elongate compared to its width, the slot could have other shapes, such as depending upon the style of the panel connector. For example, the slot S could comprise one or more apertures, openings, insets or the like.

Importantly, one or more connector mounts 320 are associated with the panel P. Preferably, the mounts 320 are located in the slot(s) S.

Figure 3:
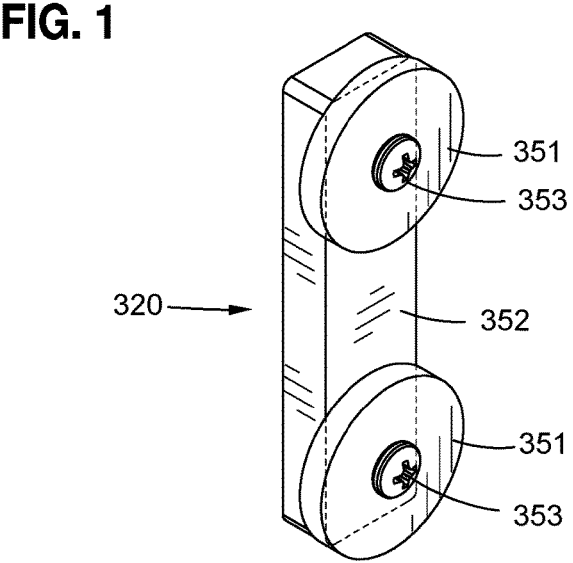
FIG. 3 is a perspective view of the connector mount illustrated in FIG. 1.

The connector mounts 320 may have various configurations. In one embodiment, as illustrated in FIG. 3, the connector mount 320 comprises a pair of washers 351 which are connected to a bracket 352 by fasteners 353. The bracket 352 may comprise, for example, a rectangular metal body which has a width close to (but less than) the width of the slot S. The washers 351 have a diameter which exceeds the width of the slot S but which is less than the diameter of the bore B. In this manner, the bracket 352 may simply be positioned in the slot S by passing the washers 351 through the bore B.

One embodiment of the invention is an innovative method for placing a connector mount 320. As illustrated in FIG. 1, a bore B is formed in the side edge SE of the panel P. The center of the bore B is co-extensive (e.g. the centerline of the bore B extends through the slot S) with the slot S. The diameter of the bore B is preferably slightly greater than the diameter of the washers 351. A mounting channel or secondary slot MS is formed in portions of the panel which define the slot S, extending laterally from the bore B. This mounting channel MS is inset into the slot S from the side edge SE of the panel, but it located above the bottom of the slot S. The bore B may, for example, be formed with a drill, router, CNC machine or the like, as may be the mounting channel MS. It will be appreciated that while the bore B might be cylindrical in shape, it might have other shapes, such as being elongated.

The user places the washers 351 down the bore B until they reach the mounting channel MS. The user then slides one washer 351 into the mounting channel MS below the bore B and one above the bore B. The user then positions the bracket 352 in the slot S and connects it to the washers 351 using the fasteners 353. At that time, the mount 320 cannot move forward or back in the slot S because the washers 351 are fixed in the mounting channel MS. At the same time, the mount 320 cannot move up or down for the same reason. The connector mount 320 thus defines a secure mounting point for a portion of a panel connector, such as the panel connector 350 which is illustrated in FIG. 4.

Such a panel connector 350 may have various configurations, such as illustrated in U.S. Pat. No. 9,068,581. In one embodiment, the panel connector 350 is generally planar, having a front face 356 and an opposing rear face (not visible in FIG. 4). The panel connector 350 may have a first side edge 358 and an opposing second side edge 360. One or more projections 354 extend outwardly from the panel connector 350, preferably from each side edge 358,360. It will be appreciated that the number of projections, their shape and spacing, may vary. In general, each projection 354 preferably defines a mount-accepting slot or area 362 between it and the main body of the panel connector 350.

Figure 4:
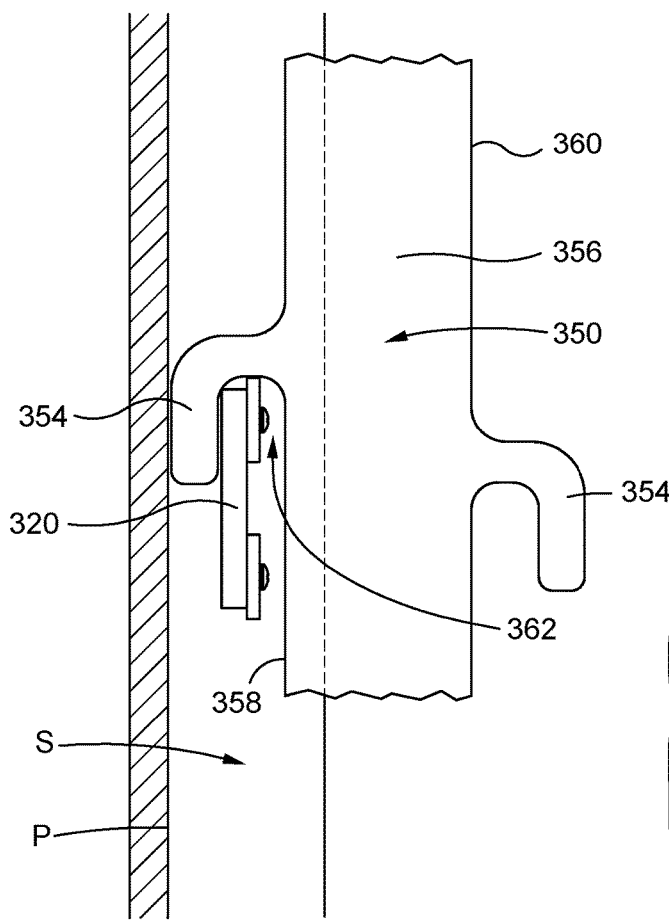
FIG. 4 is a cross-sectional side view of a portion of the panel illustrated in FIG. 1 with a panel connector engaged therewith.

As illustrated in FIG. 4, a panel P fitted with the mounts 320 may be connected to another panel or panels, or other supports, using the panel connector 350. In particular, the panel connector 350 can be extended into the slot S and the panel connector 350 and panel P may be moved relative to one another so that the projection(s) 354 extend over a corresponding mount 320. At this time, the mount 320 is located in the slot 362 defined between the main body of the panel and the projection 354, with a portion of the projection 354 extending behind the mount 320 in the slot S. In this configuration, the panel connector 350 is prevented from moving in and out of the panel P as described in U.S. Pat. No. 9,068,581 (e.g. the panel connector 350 cannot be moved laterally, but is secured to the panel P). Of course, the opposing edge 360 of the panel connector 350 may be connected to another panel P, thereby connecting the two panel in a side edge to side edge configuration (e.g. one where the panels P are connected so that they are positioned in the same plane and cannot separate from one another laterally).

As noted in U.S. Pat. No. 9,068,581, such panel connectors may have a variety of configurations, including configurations which allow panels to be mounted at angles relative to one another, in configurations where more than two panels are connected to one another, and the like. Of course, other types of panel connectors might be utilized and more than one panel connector might be utilized to connect one or more panels. Also, a panel P having mounts might be connected to structures other than other panels, such as walls and the like.

Of course, a panel P might be fitted with a plurality of mounts 320. For example, if a panel connector 350 has four spaced-apart projections 354, the panel P is preferably fitted with four corresponding mounts 320 at corresponding positions. Further, a panel P could be fitted with various configurations of mounts 320, such as to permit two or more different panel connectors 350 to be used therewith (such as where the panel connectors 350 have projections 354 in different locations or the like).

Of course, the mount 320 might have other configurations than just described and may be associated with the slot in other manners. For example, in one embodiment, the mounts 320 comprise at least a first element (and preferably first and second elements) which are mounted to a third element. At least one of the elements preferably has a width or other dimension which is greater than the width of the slot S, and most preferably, less than that of the bore B, thus allowing it to be positioned in the slot S via the bore B but preventing it from passing through the slot alone. In other embodiments, it is possible for the mount 320 to comprise a single element or just two elements. For example, in one embodiment the mount 320 might comprise an element which has at least one dimension which is wider or greater than that of the slot S, but smaller than the bore B, thus allowing the element to be lowered into the slot only through the bore and to then be positioned therein, such as in an associated mounting channel. The element might be located in a lower portion of the mounting channel (below the bore), whereby downward force by a panel connector thereon aids in retaining the element in position.

Preferably, the mount 320 can easily be associated with the panel P after formation of the slot S, once fitted is securely affixed to the panel P (e.g. will not fall out, etc., such as if the panel P is positioned in different orientations, can't be pulled out of the slot, etc.), and can be associated with the panel P with minor associated modification of the panel P (such as by boring a simple bore B). Also, the mount 320 does not extend outwardly from the side edge SE of the panel P and thus does not prevent panels from being placed directly adjacent to one another in a side to side position.

As another example, in one embodiment, a connector mount 320 might comprise a member which will fit into the bore B and which can then be extended (such as by expanding it) so that its length increases, thus causing the ends thereof to anchor into the mounting channel MS of the panel P. In another embodiment, the connector mount 320 might comprise a wedge type element which can be located in the slot S and then slid apart to increase its width, thus again causing it to be mounted to the panel.

In many applications, the integrity of the front and back of the panel is important, such as for aesthetic purposes. The above-described method permits a connector mount to be associated with a panel by only accessing the edge of the panel, rather than the front or back, thus avoiding having to resurface the front or back of the panel in such situations.

Figure 5:
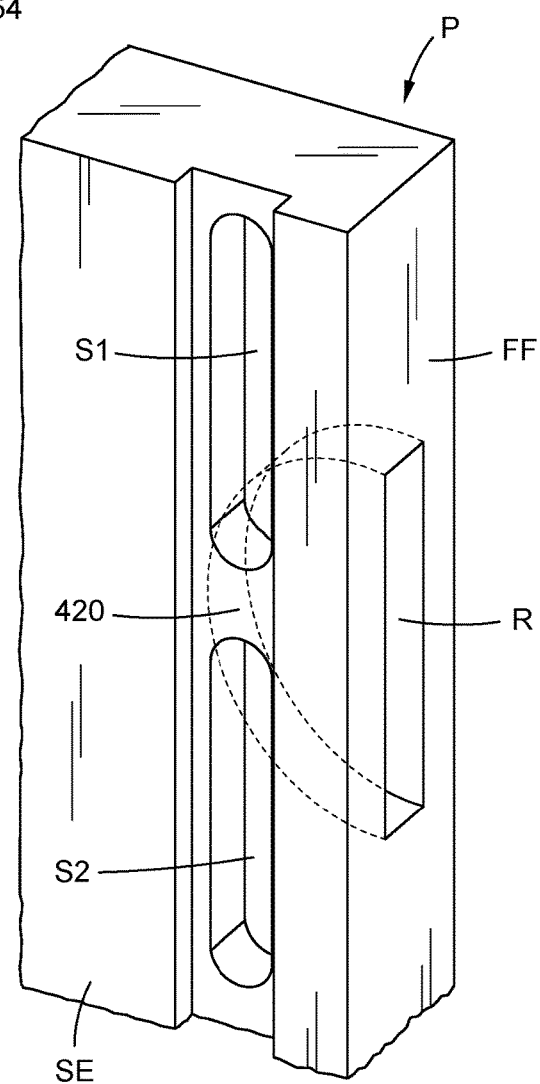
FIG. 5 is a perspective view of portion of a panel having connector mounts formed in accordance with another embodiment of the invention.

In other situations, it may be permissible to alter the front and/or back of the panel, such as where aesthetics are not as important, but where the strength of the panel is still critical. Another embodiment of the invention will be described with reference to FIG. 5. FIG. 5 also illustrates a panel P, such as similar to that described above. In this embodiment, a plurality of slots S (S1, S2, etc.) are formed in the side edge SE of the panel P. The slots S might be formed in various manners, such as by milling (e.g.—removing panel material), such as via a tool such as a router, CNC machine, etc. Preferably, the slots S are spaced apart from one another, thus leaving or defining a connector mount 420 therebetween (in one embodiment, a portion of the side edge SE of the panel may be removed at the location of the connector mount 420 so that the front of the connector mount is inset from the side edge SE of the panel P).

Of course, a number of slots S may be formed along the side edge SE of the panel P, thus defining a plurality of connector mounts 420 (which comprise portions of panel material between two adjacent slots). Again, the number of defined connector mounts 420 and their location may be chosen to mate with one or more panel connector projections of various configurations (such as to mate with a panel connector having a certain configuration of projections).

In order to permit the projection of a panel connector (such as the projection 354 illustrated in FIG. 4) to be extended into one of the slots S and then moved downwardly over the connector mount 420 so that the connector mount 420 is located in the slot between the projection and the main body of the panel connector, a space must be defined behind the connector mount 420 for accepting the connector projection. Thus, a recess R is formed behind the connector mount 420. In a preferred embodiment, this recess R is formed by milling (e.g.—removing panel material), such as via a tool such as a router, CNC machine, etc. As illustrated, the recess R may be formed in the front face FF of the panel P, near the side edge SE. In particular, the router or tool may be used to remove material laterally into the panel from the front face FF until a void or recess is formed behind the connector mount 420. In this configuration, the recess R extends perpendicular to the slots S.

Of course, more than one recess R can be formed, such as one corresponding to each connector mount 420, or large recesses may be formed corresponding to multiple connector mounts. In the embodiment illustrated in FIG. 5, a recess R is formed corresponding to each connector mount 420. In this configuration, only small spaced apart recesses are formed along the length of the panel P, rather than an elongate recess. Because panel material remains between each recess R, the panel P is much stronger. In this configuration, each individual recess R might be formed, for example, by extending a circular cutting blade into the panel P to remove material from behind the connector mount 420.

Figure 6:
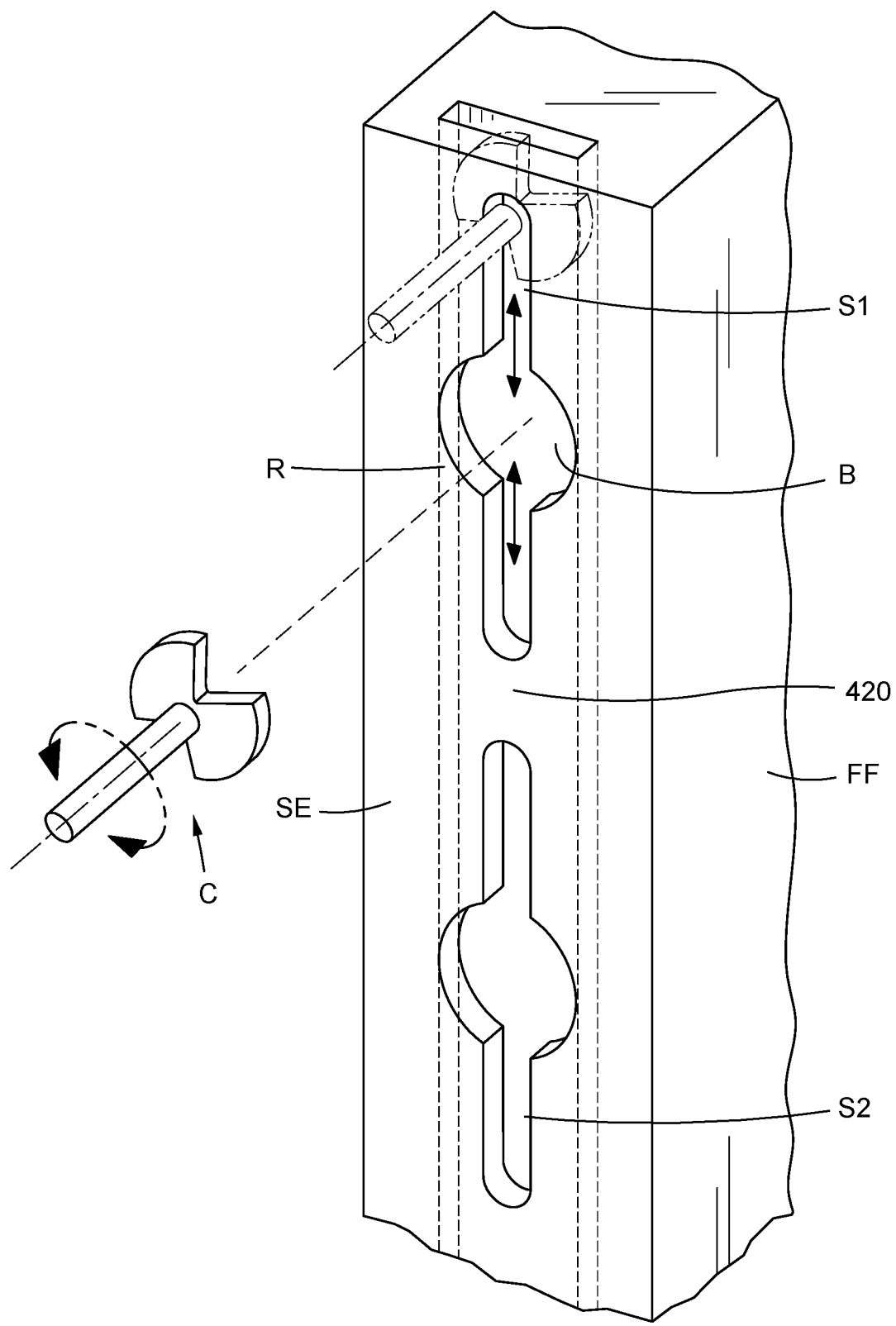
FIG. 6 is a perspective view of a portion of a panel having connector mounts formed in accordance with yet another embodiment of the invention.

Of course, the recess or recesses behind the connector mounts 420 might be formed in other manners. For example, referring to FIG. 6, slots S (S1, S2, etc.) might be formed in the side edge SE of a panel P. A bore B might then be formed which intersects or overlaps each slot S, such as in the middle of each slot. The bore B preferably has a depth which is greater than the slot S. A rotary cutter, such as a wing cutter, may then be extended into the bore B and may be moved along the length of each slot S thus removing panel material from behind the slot S, at least in the area between the slots, thus defining a panel connector 420 with a recessed space there behind for accepting a portion of a panel connector.

In use, a user can extend the projections of a panel connector (not shown) into the slots S in the panel. The projections pass through the slots and into the recess(es). The user can then move the panel connector and panel relative to one another so that the projections of the panel connector extend over the connector mounts 420 (e.g. the projections thus extend behind the connector mounts into the recess(es) R behind the mounts), thereby locking the panel connector to the panel P. Of course, another panel may be connected to an opposing side of the same panel connector, thus connecting two panels to one another.

It will be appreciated that the connector mounts 420 and associated panel connector accepting spaces associated therewith may be formed in various manners. For example, while the slots S are shown as being elongated in FIGS. 5 and 6, the slots might actually have other shapes, such as round or the like. Most preferably, the connector mounts 420 simply comprise portions of the panel P which remain between two areas where panel material is removed and which are sized to accept a portion of a panel connector. Thus, for example, two holes might be drilled in the panel P and the remaining panel material between the holes may form the connector mount. In one embodiment, as illustrated, the slots S may be themselves located in a slot or channel, such as illustrated in FIG. 5. In this manner, a portion of a panel connected can be located in the channel, with the projection(s) extending through the slots. The channel may have a sufficient depth so that when a panel connector is located between two connected panels, the panel connector is located inside of the panels, thus allowing the side edges of the panels to be positioned directly against one another.

Of course, the location of the slots or other voids/apertures, as well as the location of the recess(es) are chosen to facilitate panel connector connection in a desired configuration. In the example illustrated in FIGS. 5 and 6, the connector mounts 420 are defined at the side edge SE of the panel, whereby the panel is mounted to another panel or structure at its side edge. However, the connector mounts 420 might, for example, be defined in the front face FF or rear face of the panel (whereby the recess R is defined in the side edge SE), at a top or bottom edge or the like. For example, if a user desired to connect a first panel to a second panel at the middle of the second panel, the connector mounts 420 would be formed in the middle of the front face FF of the second panel.

It will be understood that the above described arrangements of apparatus and the method there from are merely illustrative of applications of the principles of this invention and many other embodiments and modifications may be made without departing from the spirit and scope of the invention as defined in the claims.

What is claimed is:

1. A method of connecting a first generally planar panel having a side edge and a second generally planar panel having a side edge, comprising the steps of:

forming at least one slot in said side edge of said first generally planar panel, said at least one slot connecting to a channel located a first depth in said panel from said side edge of said first generally planar panel, at least a portion of said channel having a first width greater than a second width of said slot, and said slot having a top and a bottom;

forming a bore into said side edge of said first generally planar panel at a location of said at least one slot, said bore having a diameter which is greater than a width of said slot and said bore connecting to said channel;

positioning a mounting bracket in said channel in said side edge of said first generally planar panel by extending said bracket through said slot and bore and into said channel;

affixing said mounting bracket to said panel within said channel in a position where the mounting bracket is suspended in said channel in a position where a top of said mounting bracket is positioned below a top of said slot;

forming at least one slot in said side edge of said second generally planar panel, said at least one slot connecting to a channel located a first depth in said panel from said side edge of said second generally planar panel, at least a portion of said channel having a first width greater than a second width of said slot, and said slot having a top and a bottom;

forming a bore into said side edge of said second generally planar panel at said location of said at least one slot, said bore having a diameter which is greater than a width of said slot and said bore connecting to said channel;

positioning a mounting bracket in said channel in said side edge of said second generally planar panel by extending said bracket through said slot and bore and into said channel;

affixing said mounting bracket to said panel within said channel in a position where the mounting bracket is suspended in said channel in a position where a top of said mounting bracket is positioned below a top of said slot;

extending a first projection extending from a first edge of a panel connector into said slot in said side edge of said first generally planar panel;

positioning at least a portion of said first projection behind said mounting bracket in said channel in said first generally planar panel;

extending a second projection extending from a second edge of said panel connector into said slot in said side edge of said second generally planar panel; and positioning at least a portion of said second projection behind said mounting bracket in said channel slot in said second generally planar panel.

2. The method in accordance with claim 1 wherein when positioned in said channel said mounting bracket is positioned behind at least a portion of said slot.

3. The method in accordance with claim 1 wherein said mounting brackets comprise first and second enlarged mounting elements connected to a third mounting element, said first and second enlarged mounting elements having a size which permits them from being passed into said channel through said slot but permitting them to pass into said channel through said bore, and said third mounting element having a size which permits it to be passed into said channel through said slot.

4. The method in accordance with claim 3 wherein said first and second enlarged mounting elements comprise washers and said third mounting element comprises a plate.

5. The method in accordance with claim 4 wherein said step of positioning a mounting bracket in said slot in said side edge of said first generally planar panel comprises extending said plate into said channel through said slot, extending said washers through said bore into said channel and then connecting said washers to said plate.

* * * * *